1

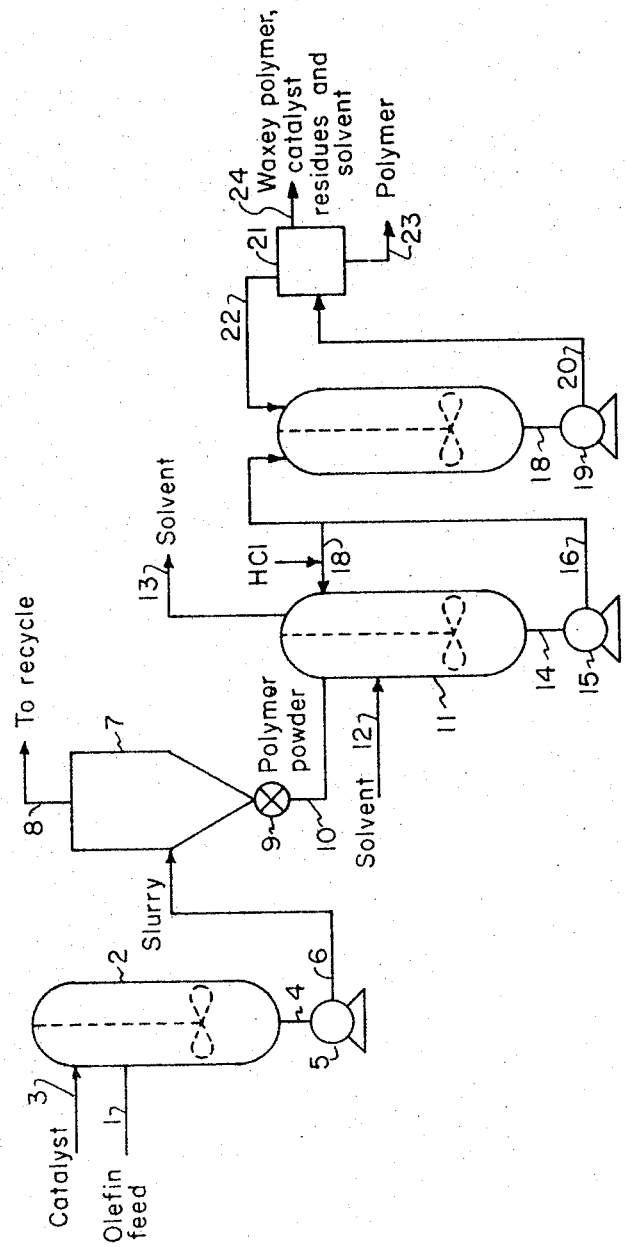
Aug. 19, 1969   A. B. STRYKER, JR., ET AL   3,462,404
UPGRADING OF ALPHA-OLEFIN POLYMERS AND COPOLYMERS
Filed Aug. 9, 1965
ABNER B. STRYKER, JR.
PHILIP MESSINA
INVENTOR.
BY
Fred S. Valles
Attorney United States Patent Office 3,462,404
Patented Aug. 19, 1969

3,462,404
UPGRADING OF ALPHA-OLEFIN POLYMERS
AND COPOLYMERS
Abner B. Stryker, Jr., Paramonga, Peru, and Philip Messina, Hanover, Md., assignors by mesne assignments, to Dart Industries, Inc., a corporation of Delaware
Filed Aug. 9, 1965, Ser. No. 478,214
Int. Cl. C08f 1/94, 1/88, 1/32
U.S. Cl. 260—93.7
9 Claims This invention relates to a highly efficient continuous process for the removal of catalyst residues and low molecular weight polymer fractions from an alpha-olefin polymer or copolymer prepared in particle form. The invention is particularly concerned with an improvement in a continuous method for removing catalyst residues and low molecular weight polymer fractions from a particle form polymer or copolymer prepared by the use of transition metal halide catalysts activated with organometallic reducing compounds.

It is known to remove catalyst residues from polymers of alpha-olefins by the use of agents known in the art as deashing agents, such as alcohols. It is, moreover, known to employ in conjunction with alcohols, normally liquid hydrocarbons such as hexane or heptane and to upgrade the polymer by removing low molecular weight polymer fractions as well as the catalyst residues. In these so-called deashing and upgrading operations, the literature discloses both batch and continuous techniques for deashing alpha-olefin polymers, specifically polymers prepared by the use of a transition metal halide such as a titanium halide and an organometallic reducing compound such as an aluminum alkyl. Solution techniques for deashing such alpha-olefin polymers have also been disclosed, but the actual deashing operations differ in scope, since in one case the polymer is maintained in solution in the solvent, whereas in the other, the polymer is in the form of small particles which contain imbedded therein the catalyst particles used in the polymerization.

As polymer technology advances in the art, new applications are found which require a purer polymer than when such compositions were relatively new. One example of this is polypropylene, which not long ago was introduced commercially and has found a wide variety of end use applications. At first it was not unusual to find polypropylenes in commerce which contained high amounts of catalyst residues, such as for example, 100 p.p.m. or more based on the polymer. As the industry became more sophisticated and found that certain end use patterns required more stable, heat resistant, ultra-violet resistant and purer materials, it became imperative to remove polymer ash (catalyst residues) and to upgrade the polymer to a greater extent than had previously been practiced. In consequence of this, many schemes were developed for preparing purer or cleaner polypropylenes, but to this date, many of these goals have still fallen short. Because of this, many polymer manufacturers have had to resort to stabilization of the catalyst residues in the polymer in order to be able to qualify for the necessary end use requirements.

In the various techniques developed for deashing olefin

2 polymers, both batch and continuous processes as indicated above have been described. While batch processes may have certain desirable features in deashing operations due to the ability of the operator to control the residence time of the polymer in the deashing system, economically, a continuous process offers a better incentive. In a continuous process, however, it is difficult to obtain maximum ash or catalyst residue removal as well as low molecular weight polymer fractions due to the nature of the operation. Thus, in continuous operation as is known it is required that a deashing system be operated with continuous introduction and withdrawal of a polymeric material. If one visualizes the process of continuous feeding and continuous removal of polyolefin slurry to and from a single well-stirred deashing vessel, it is believed that there is a wide variation of residence time with respect to each polymer particle in the deashing zone. Thus, some polymer particles will be present in the deashing zone a minimum of time, while some will remain in the zone a little longer, while the remainder will be present an even longer time than is required for the extraction of catalyst residue and low molecular weight polymer fractions. The residence time for all the polymer particles in the deashing zone is averaged and this then becomes the average residence time for a particular deashing operation employing a single well-stirred heat-treating vessel. The end result, however, is that a substantial percentage of polymer particles being treated in such a continuous process are not, as a matter of fact, present in the treatment zone for the optimum times required for efficient catalyst residue removal and thereby result in a final product containing incompletely, median and substantially completely deashed particles. Experience has shown that in such a system it is difficult to obtain consistently a polymer containing less than 100 parts per million of catalyst residues and a higher goal for example of 50 parts per million or less is practically unattainable. It is to be noted that in many systems of the foregoing type the main deashing treatment step is usually accompanied by reslurrying and washing operations. These after-treatment steps, however, which follow such single stage deashing operations serve only as processing aids in the separation of the deashed polymer from its deashing solvent or agent.

It is an object of this invention to provide an efficient process for continuously deashing a particle form polymer and for upgrading said polymer by maximum removal of low molecular weight polymer fractions.

It is a further object of this invention to provide a novel process for deashing poly-alpha-olefins prepared in particle form in a continuous process.

It is a still further object of this invention to provide a novel method for continuously deashing polypropylene prepared by a transition metal halide and organometallic reducing agent in particle form whereby a maximum amount of catalyst residues and low molecular weight polymers are separated therefrom.

The foregoing objects are accomplished herewith by providing an improvement in a process for removing catalyst residues and low molecular weight soluble polymer fractions from an alpha-olefin polymer (or copolymer) in particle form wherein said polymer is obtained by polymerizing an alpha-olefin monomer in the presence of a transition metal halide catalyst activated with an organometallic reducing agent and wherein said polymer is contacted with a composition comprising an alcohol and a normally liquid hydrocarbon to extract said catalyst residues and low molecular weight polymer fractions and separating the extracted catalyst residues and polymer fractions from said polymer, the improvement comprising providing a method for purifying said polymer by substantially completely removing said catalyst residues and low molecular weight polymer fractions by continuously introducing the alpha-olefin polymer in contact with said alcohol-hydrocarbon composition to a first heat treatment zone and maintaining the introduced material under conditions of agitation at a temperature of from 135° to 250° F. for an average residence time of said polymer of from ½ hour to 2 hours, continuously withdrawing from said first zone a slurry of polymer, alcohol and hydrocarbon and introducing the polymer and said alcohol-hydrocarbon composition to at least one other heat treatment zone in series with said first zone and maintaining said other zone under conditions of agitation at a temperature of from about 100° to 200° F. for an average residence time of said polymer in said zone of from about 15 minutes to one hour. The polymer from the foregoing series-staged treatment is continuously recovered and sent to any suitable separation device wherein the purified polymer is removed from the alcohol-hydrocarbon phase which now contains the catalyst residues and low molecular weight polymer fractions.

The series-staged heat treatment describd above which employs two or more vessels in series has been found to yield a polymer of extreme purity with respect to catalyst residues and with respect to soluble waxy or amorphous fractions. It is believed that the excellent results obtained are due to the fact that, whereas in the prior art the total amount of time for each polymer particle in the heat treatment zone varied considerably resulting, therefore, in some incompletely deashed polymer particles, by employing two or more deashing stages in series the probability that any polymer particle will move through two well-stirred vessels in less than the minimum amount of time required for maximum deashing, that is, an appropriate residence time, is substantially nil. Examples of 1 and 2-stage deashing as set forth herein will be illustrated hereinafter.

In a broad embodiment of this invention an alpha-olefin polymer in slurry (particle) form is introduced continuously to two or more vessels in series under conditions of agitation, while employing as a deashing solvent a mixture of an alcohol and a hydrocarbon. In this broad embodiment, the alpha-olefin polymer in slurry form is recovered from the second or third vessel in series and subsequently separated from the liquid components which will now contain the catalyst residues and low molecular weight polymer fractions.

In the preferred embodiment of this invention, an olefin such as propylene is polymerized in liquid form using a titanium trichloride catalyst in combination with an aluminum alkyl, is withdrawn as a particle form slurry from the reaction vessel, is flashed from its slurry in a typical cyclone-bag filter combination unit and is thereafter fed as a substantially dry powder to a deashing operation. A copolymer or block copolymer can be processed similarly except that in the case of a block copolymer a further polymerization step is required as is known in the art. In the deashing operation, the powder is continuously fed to a first vessel which is maintained under constant agitation at a temperature of from 150° to 210° F., but preferably 190° to 200° F. A deashing solvent is also continuously introduced to this vessel (and subsequently from this vessel to the second vessel) in an amount of from about 3 to 15 pounds of solvent per pound of polymer, preferably 4 to 6 pounds of solvent per pound of polymer, the solvent preferred being a combination of isopropanol and heptane in azeotrope or near azeotrope proportions. The average retention time for this first digestion or heat treatment step of the process is from 30 minutes to 2 hours, preferably 1 hour and a slurry is continuously withdrawn from this vessel and taken directly to a second vessel in series, which second vessel is also a well-stirred unit maintained at temperatures of from 130° to 160° F., preferably around 150° F. In an alternate embodiment of the invention, the polymer can be separated from the slurry after the first heat treatment step and fresh or purified deashing solvent can then be employed in the second heat treatment step. The average retention time of the polymer in the second vessel is from about 15 minutes to one hour, but preferably about 30 minutes. The pressure employed in each of the deashing vessels is that which will prevent substantial evaporation of the deashing solvent and it will vary with the particular deashing temperature in question. Since it is desired to minimize vaporization of the solvent from each of the heat treating vessels in question, pressures slightly above atmospheric can be employed at the higher deashing temperatures, specifically those temperatures which are above the azeotropic boiling point of the alcohol-hydrocarbon deashing system.

In order to more clearly illustrate the specific process steps of this invention, reference is made to the attached drawing which is incorporated herein by reference and which represents a preferred two-stage heat teatment operation for deashing of a polypropylene.

In the drawing, 1 represents a line for introducing liquid propylene for example, to vessel 2 which is a stirred reactor capable of withstanding pressures of up to 1,000 p.s.i. or higher. Catalyst can be introduced to the reactor through line 3 and the polymerization conducted therein in the liquid phase. A slurry of polymer is taken through line 4, pump 5 and line 6 to a cyclone-bag filter unit 7 where the polymer particles are separated from unreacted propylene monomer by flashing. Such a separation is usually substantially complete, so that a powder is obtained containing less than about 5% volatiles. The flashed propylene can be recovered through line 8 and sent to recycle while the polymer is discharged via valve 9 to line 10 and to vessel 11, which is a first stage heat treatment for the deashing system. Vessel 11 is provided with a stirrer and a solvent such as an alcohol and a hydrocarbon can be introduced through line 12. Vaporized solvent, if any, can be removed via line 13 for further use or recycle. A pump 15 withdraws polymer slurry continuously from vessel 11 through line 14 and pumps it through line 16 to the second heat-treat vessel 17 in series with unit 11. In an alternate embodiment, the polymer slurry can be withdrawn from vessel 11 and taken to facilities (not shown) for separating the polymer from the solvent and thereafter introducing the polymer as well as fresh or purified solvent to the next vessel 17. Some of the polymer slurry from line 16 can be recycled through line 18, if desired, to vessel 11 to provide for even a better distribution of residence time of particles that may have exited from vessel 11 too soon. If desired, it is permissible to add from about 0.08 to 0.1 percent of HCl (based on the deashing solvent) to line 18 or directly to the vessel. The deashing efficiency of the process herein is so complete that the HCl addition can be dispensed with. Vessel 17 is also a well-stirred vessel and a pump 19 continuously withdraws polymer slurry via line 18 and pumps it to a suitable separation unit 21 via line 20. The separation unit 21 can be any well known device for separating solids from solvents. Some of the volatile solvents, if desired, can be recycled via line 22 from unit 21 to vessel 17. Line 23 withdraws a highly purified polymer from vessel 21 (or a subsequent vessel or vessels which aid in separation of the polymer deashed from deashing liquid while 24 represents the line for withdrawal of waxy polymer in the solvent, as well as catalyst residues.

While propylene has been indicated herein as the preferred monomer, it is to be understood that this invention is applicable to the polymerization of other olefins, such as ethylene and, in general alpha-olefins containing from 2 or 9 or more carbon atoms (butene-1, pentene-1, etc.). The invention is also applicable to deashing of copolymers of any of the foregoing monomers and block copolymers thereof.

The catalysts normally employed in the prior art for polymerizing alpha-olefins, such as the well known transition metal chlorides and aluminum alkyls, are likewise applicable here, specifically the more active ones such as titanium trichloride and aluminum alkyls such as the trialkyls or dialkyl monohalides.

It is preferred to operate a polymerization process wherein no normally liquid diluent is present in the reaction zone other than the monomer or the monomer plus a liquefied normally gaseous hydrocarbon, so that the polymer product can be separated efficiently from the volatiles by a simple flashing operation as indicated in the drawing.

Suitable hydrocarbon-alcohol mixtures that can be employed as deashing and upgrading media include normally liquid hydrocarbons such as hexane, heptane, octane, as well as aromatic hydrocarbons such as toluene and xylene. Suitable alcohols are those having from 1 to 4 carbon atoms, or higher if desired, such as ethanol, propanol, isopropanol, butanol and amyl alcohol. It is further preferred that this combination of alcohol and hydrocarbon be in azeotropic form or substantially azeotropic form. Suitable azeotropes can be prepared from any of the foregoing components which will boil azeotropically in a temperature range of from about 150° to 300° F. For example, isooctane (47%) and ethanol (53%) boil at about 162° F., while m-xylene (14%) and isobutanol (86%) boil at about 227° F. The particularly preferred azeotrope of heptane (49.5%) and isopropanol (50.5%) boils at around 169° to 170° F. The particular boiling point of the azeotrope is taken into account in the heat treatment vessels' temperature and pressure employed the deashing operation. With the heptane-isopropanol azeotrope the temperatures indicated hereinabove are especially suitable.

The deashing process of this invention results in a clean polymer containing consistently less than 50 p.p.m. of catalyst residues. As a matter of fact, it is usual to routinely obtain a polymer with less than 30 p.p.m. of combined titanium, aluminum and chloride residues. Such low levels of catalyst residues have not heretofore, to the best of present knowledge, been obtained consistently in continuous deashing operations.

The following examples illustrate the unique efficiency of this process.

EXAMPLE 1

In a small pilot plant unit employing an arrangement of units substantially as illustrated in the drawing, but operating under the alternate embodiment of this invention as hereinbefore described, propylene polymers having melt indices of 0.5 and 0.6 were deashed in a two stage system using a ratio of solvent (heptane-isopropanol azeotrope) to polymer of about 4 to 5:1. Digestion of the polymer slurry in the first vessel was carried out continuously at about 200° to 210° F. The polymers, prior to deashing, had boiling heptane insoluble contents of 91.5 percent and after the continuous two stage treatment, boiling heptane insoluble contents of 95.4 percent. Table I below illustrates the results obtained (second stage deashing temperature was about 150° F.). The residence time in the first stage was about one hour and in the second stage about 15 minutes to 30 minutes. A small amount of HCl (less than about 0.1 percent) was employed in each of the runs with the deashing liquid.

TABLE I

| Run No. | M.I. | Stage | Contaminants (p.p.m.) | | | Total (p.p.m.) |
|---|---|---|---|---|---|---|
| | | | Ti | Al | Cl | |
| 1 | 0.5 | 1 | 24 | 37 | 460 | 521 |
| | | 2 | 5 | 14 | 23 | 42 |
| 2 | 0.6 | 1 | 13 | 26 | 330 | 369 |
| | | 2 | 3 | 13 | <10 | 26 |

In the above runs the chloride values reported on the wet cake were converted to a dry basis.

EXAMPLE 2

A polypropylene polymer as above, except of different melt index, was continuously deashed in a two stage system similarly to Example 1. In this example, however, a first stage digestion temperature of 180° F. was employed. Table II below shows the results.

TABLE II

| Run No. | M.I. | Stage | Contaminants (p.p.m.) | | | Total (p.p.m.) |
|---|---|---|---|---|---|---|
| | | | Ti | Al | Cl | |
| 3 | 0.4 | 1 | 6 | 29 | 238 | 273 |
| | | 2 | <1 | 15 | 24 | 40 |
| 4 | 0.3 | 1 | 25 | 51 | 323 | 394 |
| | | 2 | <1 | 20 | <10 | 31 |

EXAMPLE 3

A series of single stage (continuous) deashing operations were carried out for a propylene polymer as above employing a digestion temperature of 180° F., a one hour residence time and using 0.03% HCl based on the heptane-isopropanol azeotrope. Table III illustrates this.

TABLE III

| Run No. | M.I. | Contaminants (p.p.m.) | | | Total (p.p.m.) |
|---|---|---|---|---|---|
| | | Ti | Al | Cl | |
| 5 | 4.2–5.4 | 24 | 82 | 40 | 146 |
| 6 | 4.2–5.4 | 17 | 29 | 60 | 106 |
| 7 | 4.2–5.4 | 18 | 40 | 40 | 98 |

EXAMPLE 4

The following runs illustrate large scale continuous deashing runs where steady state conditions were employed (all runs had lined out and the polymer sampling was on a routine basis). Deashing was carried out in a unit assembly substantially as shown in the drawing. The deashing liquid was an azeotrope of heptane-isopropanol and the digestion temperature for the first stage was about 190° to 200° F. The second stage digestion temperature was about 150° F. and a solvent (azeotrope) to polymer ratio in pounds of from 4 to 5:1 was employed. The residence time for the first stage heat-treat vessel was about one hour and that of the second vessel about 15 to 30 minutes. The polymer prior to deashing had a boiling heptane insoluble content of about 92 percent. Table IV below illustrates typical results.

TABLE IV

| Run No. | Final H.I. | M.I. | Contaminants (p.p.m.) | | | Total (p.p.m.) |
|---|---|---|---|---|---|---|
| | | | Ti | Al | Cl[1] | |
| 1 | 96.1 | 4.1 | <2 | 2 | <15 | <19 |
| 2 | 96.5 | | <2 | 5 | <15 | <22 |
| 3 | 96.5 | 3.4 | <2 | 4 | <15 | <21 |
| 4 | 96.3 | 7.5 | 2 | 4 | <15 | <21 |

[1] Chloride residue value generally range from less than 5 to less than about 15.

Each of the runs illustrated in Table IV was in the commercial lot category and this example illustrates the consistently substantially complete removal of catalyst residues from a propylene polymer as well as upgrading thereof by removal of about 4 to 5 percent of atactic or low molecular weight polymer soluble in heptane at the deashing temperatures illustrated. It is to be noted that the metallic residues, particularly titanium, which when present in amounts of for example over 10 p.p.m. in the polymer creates certain end use limitations and problems, is in these runs present in amounts of only 2 or below parts per million. Aluminum, likewise, is reduced to a base minimum so that the polymer consistently contains less than 10 parts per million of both titanium and aluminum residues. Deashed polypropylene of the type illustrated in this example is thus eminently suitable for even the most stringent applications which require the highest degree of purity. In the runs above HCl was used in an amount of 0.08 to 0.1% based on the weight of the solvent in runs 2 and 4 only.

The results illustrated for Examples 1, 2 and 3 as noted above were those obtained from operation of a small pilot plant. In each of these examples a truly lined out operating condition had not been achieved and due to this and other mechanical operation problems, the total catalyst residue values were somewhat higher than those of Example 4 where optimum deashing conditions were employed. It should be noted, nevertheless, that the sampling of the polymer for catalyst residue values in both first and second stages of Examples 1 and 2 strikingly illustrates the efficiency of a continuous two stage deashing system with two vessels in series. Note also the results of Example 3 where only one continuous stage was employed to remove catalyst residues from polypropylene.

The advantage offered by the process of this invention in the field of polymer deashing are obvious. Thus a clean polymer as in Example 4 has the advantage that no further additives are required to stabilize the metal residues such as titanium. The color of the polymer is excellent and the minute amounts of metal residues present have a nil effect on other additives normally employed in polypropylene.

As hereinfurther noted, more than two vessels in series can be used in accordance with this invention. The outstanding results obtained by the use of two vessels in series as illustrated, however, substantially eliminates the need for further units in the system herein described. Other modifications can be made to this invention without departing from its scope or the coverage of the claims appended hereto.

What is claimed is:

1. In a process for removing catalyst residues and low molecular weight soluble polymer fractions from an alpha-olefin polymer in solid particle form wherein said polymer is obtained by polymerizing an alpha-olefin monomer in the presence of a transition metal halide catalyst activated with an organometallic reducing agent and wherein said polymer is contacted with a composition comprising an alcohol and a normally liquid hydrocarbon to extract said catalyst residues and low molecular weight soluble polymer fractions and separating the extracted catalyst residues and soluble polymer fractions from said alpha-olefin polymer in a separation unit, the improved method of continuously purifying said polymer by substantially completely removing said catalyst residues and low molecular weight soluble fractions which comprises introducing said alpha-olefin polymer in contact with said alcohol hydrocarbon composition in a first heat treatment zone, maintaining said first zone under conditions of agitation and at a temperature of from about 135° to 250° F. for an average residence time of said polymer of from about one half hour to two hours, continuously withdrawing from said first zone a slurry of polymer, alcohol and hydrocarbon and introducing said withdrawn slurry to at least one other heat treatment zone in series with said first zone, maintaining said other zone under conditions of agitation and at a temperature of from about 100° to 200° F. for an average residence time of said polymer in said zone of from about fifteen minutes to one hour, continuously withdrawing from said other zone a slurry of polymer, alcohol and hydrocarbon and introducing said withdrawn slurry to said separation unit, and recovering from said second zone separation unit an alpha-olefin polymer which is purified with respect to catalyst residues and low molecular weight soluble polymer fractions.

2. The process of claim 1 wherein the first heat treatment zone is maintained at a temperature of from about 150° to 210° F. and the second heat treatment zone in series with said first zone is maintained at a temperature of from 130° to 160° F.

3. The process of claim 1 wherein the alpha-olefin polymer is a copolymer.

4. The process of claim 1 wherein the alpha-olefin polymer is a block copolymer.

5. In a process for removing catalyst residues and low molecular weight soluble polymer fractions from polypropylene in solid particle form wherein said polypropylene is obtained by polymerizing propylene in the presence of a titanium trichloride activated with an aluminum alkyl compound and wherein said polypropylene is contacted with a composition comprising an alcohol and a normally liquid hydrocarbon to extract said catalyst residues and low molecular weight soluble polymer fractions and separating the extracted catalyst residues and solid polymer fractions from said polypropylene in a separation unit, the improved method of continuously purifying said polypropylene by substantially completely removing said catalyst residues and low molecular weight soluble polymer fractions, which comprises introducing said polypropylene in contact with said alcohol-hydrocarbon composition in a first heat treatment zone, maintaining said first zone under conditions of agitation and at a temperature of from about 150° to 210° F. for an average residence time of said polypropylene of from about one-half hour to two hours, continuously withdrawing from said first zone a slurry of polypropylene, alcohol and hydrocarbon and introducing said withdrawn slurry to a second heat treatment zone in series with said first zone, maintaining said second zone under conditions of agitation and at a temperature of from about 130° to 160° F. for an average residence time of said polypropylene in said zone of from about 15 minutes to 1 hour, continuously withdrawing from said other zone a slurry of polymer, alcohol and hydrocarbon and introducing said withdrawn slurry to said separation unit, and recovering from said separation unit a polypropylene polymer which is purified with respect to catalyst residues and low molecular weight soluble polymer fractions.

6. The process of claim 5 wherein the alcohol-hydrocarbon composition is substantially an azeotrope.

7. In a process for removing catalyst residues and low molecular weight soluble polymer fractions from a polymer selected from the group consisting of homopolymers of alpha-olefins, copolymers of alpha-olefins and block copolymers of alpha-olefins in solid particle form wherein said polymer is obtained by polymerizing an alpha-olefin monomer in the presence of a titanium halide catalyst activated with an aluminum alkyl and wherein said polymer is contacted with a composition comprising a $C_1$–$C_5$ alcohol and a normally liquid hydrocarbon to extract said catalyst residues and low molecular weight soluble polymer fractions and separating the extracted catalyst residues and soluble polymer fractions from said polymer in a separation unit, the improved method of continuously purifying said polymer by substantially completely removing said catalyst residues and low molecular weight soluble polymer fractions, which comprises introducing said polymer in contact with said alcohol-hydrocarbon composition in a first heat treatment zone, maintaining said first zone under conditions of agitation and at a temperature of from 150° to 210° F. for an average residence time of said polymer of from about one half hour to 1 hour, continuously withdrawing from said first zone a slurry of polymer, alcohol and hydrocarbon and introducing said withdrawn slurry to a second heat treatment zone in series with said first zone, maintaining said second zone under conditions of agitation and at a temperature of from about 130° to 160° F. for an average residence time of said polymer in said zone of from about 15 minutes to about one half hour, continuously withdrawing from said other zone a slurry of polymer, alcohol and hydrocarbon and introducing said withdrawn slurry to said separation unit, and recovering from said second zone separation unit an alpha-olefin polymer which is purified with respect to catalyst residues and low molecular weight soluble polymer fractions.

8. The process of claim 7 wherein polypropylene is the polymer and is recovered from the second zone containing less than 50 p.p.m. of catalyst residues.

9. The process of claim 7 wherein the alcohol-hydrocarbon composition is an azeotrope of isopropanol and heptane.

References Cited

UNITED STATES PATENTS

| | | |
|---|---|---|
| 3,001,976 | 9/1961 | Langer et al. |
| 3,296,238 | 1/1967 | Van der Plas. |

JOSEPH L. SCHOFER, Primary Examiner

R. A. GAITHER, Assistant Examiner

U.S. Cl. X.R.

260—88.2, 94.9